United States Patent

[11] 3,616,019

[72] Inventors Heinz Mueller-Tamm
Ludwigshafen;
Dieter Mahling, Neuleiningen; Hans Friedlingsdorf, Bad Durkeim; Alfred Hofmann, Boxheim, all of Germany
[21] Appl. No. 775,384
[22] Filed Nov. 13, 1968
[45] Patented Oct. 26, 1971
[73] Assignee Badische Anilin & Soda-Fabrik Aktiengesellschaft
Ludwigshafen, Germany
[32] Priority Nov. 16, 1967
[33] Germany
[31] P 17 04 505.5

[54] PRODUCTION OF LAMINATED PLANE BUILDING COMPONENTS COMPRISNG A THERMOPLASTIC INNER LAYER AND METAL OUTER PLIES
5 Claims, 1 Drawing Fig.
[52] U.S. Cl. .................................................. 156/244, 156/309
[51] Int. Cl. .................................................. B29c 9/00
[50] Field of Search .......................................... 156/244, 306, 309; 161/216, 252

[56] References Cited
UNITED STATES PATENTS
| | | | |
|---|---|---|---|
| 3,111,419 | 11/1963 | Nahin | 156/244 X |
| 3,322,610 | 5/1967 | Brooks et al. | 156/244 X |
| 3,436,297 | 4/1969 | Brooks et al. | 156/244 |
| 3,440,129 | 4/1969 | Anselm | 156/244 X |

*Primary Examiner*—Carl D. Quarforth
*Assistant Examiner*—Stephen J. Lechert, Jr.
*Attorney*—Johnston, Root, O'Keefe, Keil, Thompson & Shurtleff

ABSTRACT: A process for the production of plane building components, comprising relatively thick inner ply of a thermoplastic and relatively thin outer plies of metal. In the process a board is prepared continuously from a polyethylene by means of an extruder at elevated temperature, the board thus obtained is continuously covered on each side first with a film of an ethylene polymer containing carboxyl groups by means of at least one pair of rollers and then with metal sheeting, the whole being made into a sandwich assembly under roller pressure and the plane building component formed being cooled to ambient temperature.

PATENTED OCT 26 1971 3,616,019
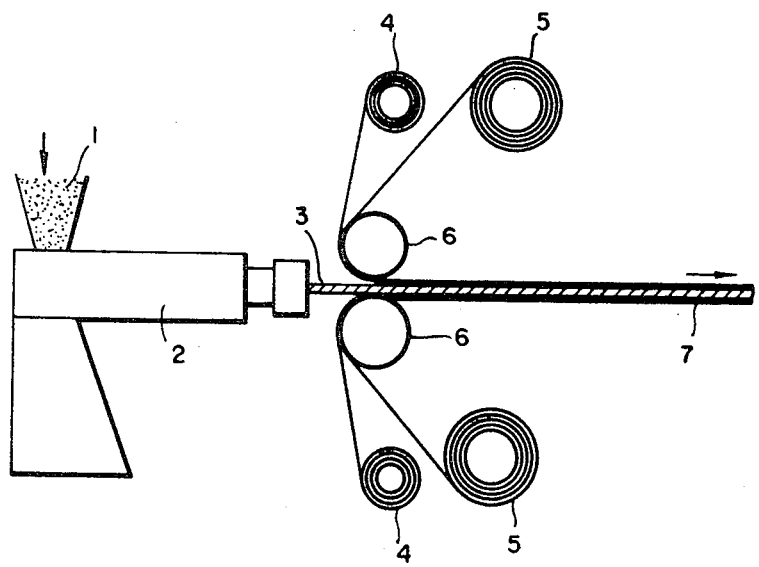
INVENTORS:
HEINZ MUELLER-TAMM
DIETER MAHLING
HANS FRIELINGSDORF
ALFRED HOFMANN
BY
Marzall, Johnston, Cook + Root
ATT'YS

PRODUCTION OF LAMINATED PLANE BUILDING COMPONENTS COMPRISNG A THERMOPLASTIC INNER LAYER AND METAL OUTER PLIES

The present invention relates to a process for the production of plane building components which are composed of a relatively thick inner ply of a thermoplastic and relatively thin outer plies of metal.

In conventional methods of this type, the building components are prepared for example using extrusion coating equipment. A board of polyethylene (which is to be the relatively thick inner ply) first has applied to it an adhesion promotor between the polyethylene and the outer plies of metal. This adhesion promotor is either a contact adhesive or a two-component adhesive based on an epoxide.

The said methods have the disadvantage that they are complicated and the adhesion between metal and plastics material (polyethylene) leaves much to be desired. When contact adhesives are used only low-creep rupture strength and inadequate resistance to high temperatures are achieved. On the other hand, bonding by means of two-component adhesives requires expensive apparatus and long curing times and gives relatively brittle joints; the components are moreover incapable of being deep-drawn. Furthermore, in order to obtain a relatively good bond it is always necessary to subject the metal and polyethylene surfaces to be bonded to a pretreatment, for example an oxidizing pretreatment.

The present invention has for its object to provide a method of the type mentioned above which does not have the said disadvantages or has them in considerably smaller degree.

We have now found that this object is achieved when the outer plies of metal are applied to the polyethylene (which is to be the relatively thick inner ply) by means of a special adhesion-promoting layer under special process conditions.

The present invention accordingly consists in a process of the type mentioned above in which a board having a thickness of from 1 to 20 mm. is prepared continuously from a polyethylene having a density of 0.916 to 0.965 g./cm.$^3$ by means of an extruder at a temperature of the material of 100° to 250° C. (preferably 150° to 220° C.), the board thus obtained is then covered continuously on each side by means of at least one pair of rollers at a temperature of the material of 100° to 250° C. (preferably 110° to 180° C.) first with a film having a thickness of 0.01 to 0.5 mm. of an ethylene polymer which contains carboxyl groups, is devoid of polymerized units of esters of ethylenically unsaturated carboxylic acids and has a melting range of from 70° to 130° C., a Shore hardness C of 50 to 95 and a modulus of elasticity of 50 to 2,500 kg./cm.$^2$, and then with a sheet of metal which is thinner than the polyethylene board by a factor of from 3 to 30 (preferably from 5 to 15), the whole being combined to a sandwich element under a roller pressure of 0.1 to 4 kg./cm.$^2$ and the plane building component thus obtained being cooled or allowed to cool to ambient temperature.

Commercial polyethylene having a density of 0.916 to 0.965 g./cm.$^3$ is suitable for carrying out the process according to the invention. The adhesive film to be used according to the invention consists of an ethylene polymer known per se which can be processed into film by methods conventionally used for ethylene polymers. Conventional metal sheeting may be used; for example sheeting of aluminum, copper, brass and steel have proved to be suitable.

The production of the plane building components may be carried out by means of conventional equipment for the production of plastics boards at a production rate of up to 2.5 meters per minute. This equipment consists in the present case of an extruder, at least one pair of rollers and a cooling zone. The bond between polyethylene, adhesive film and sheet metal is effected by bringing these components into contact in the nip of at least two rollers, the polyethylene which is still hot causing the adhesive film to melt temporarily. After bonding has taken place, the building component is cooled or allowed to cool to ambient temperature.

The accompanying drawing shows diagrammatically a hopper 1 containing granulated polyethylene, an extruder 2, the polyethylene board 3 formed, adhesive films 4, sheet metal 5, rollers 6 and building component 7.

Building components prepared according to the invention may be shaped by conventional methods, for example bent, rounded, turned over, flanged, embossed, corrugated or deep-drawn. They may be joined with each other or with other materials by riveting, heat sealing, bonding, nailing, screwing or clamping.

The building components may be used in many ways, a few of them being given below:

The building components may be used in buildings as self-supporting roofs, facade boards, partitions, ventilation shafts, balcony railings, cornices and garage doors. Walls of silos or walls and linings of stables may also be made advantageously with them.

In road construction the building components are suitable for example for road signs, antidazzle screens or safety barriers. In vehicle construction the building components may be used with advantage for the walls and roofs or railway cars, for sun roofs and insulating jackets for tank cars because of their favorable ratio of rigidity to weight, good resistance to corrosion and good thermal insulation. In road vehicles they are suitable for example for box bodies, sidewalls and driver's cabins of lorries or for outer walls of caravans. In shipbuilding they are suitable for the construction of inner walls and superstructures.

The building components may also be used in the construction of vessels and containers, for example for food troughs, water reservoirs, casings for instruments or covering hoods for machines and equipment.

The invention is illustrated by the following Example.

EXAMPLE

A board having a thickness of 3 mm. is extruded continuously in an extruder having a 90 mm. screw and a sheeting die 600 mm. in width at a temperature of the material of 190° C. from a polyethylene having a density of 0.918 g./cm.$^3$. The board which is still hot (temperature about 160° C.) is coated on each side with a 0.1 mm. thick film of an ethylene polymer containing carboxyl groups, devoid of polymerized units of ethylenically unsaturated carboxylic acids and having a melting range of from 98° to 104° C., a Shore hardness C of 77 and an elasticity modulus of 1,850 kg./cm.$^2$, and at the same time, also on each side, with an aluminum foil having a thickness of 0.3 mm., the whole then being brought into intimate contact by passage through a pair of rollers heated to 70° C. under a roller pressure of 1 kg./cm.$^2$. The whole is then allowed to cool.

We claim:

1. A process for the production of building components comprising a relatively thick inner ply of a thermoplastic polymer and relatively thin outer plies of metal, which process comprises extruding a sheet having a thickness of 1 to 20 mm. of a polyethylene having a density of 0.916 to 0.965 g./cm.$^3$ at a temperature of the polyethylene of 100° to 250° C., applying to the resultant sheet on each face at a temperature of the polyethylene of from 100° to 250° C. (a) first a film having a thickness of 0.01 to 0.5 mm. of an ethylene polymer containing carboxyl groups, devoid of units of polymerized esters of ethylenically unsaturated carboxylic acids and having a melting range from 70° to 130° C., a Shore hardness C of from 50 to 95 and a modulus of elasticity of 50 to 2,500 kg./cm.$^2$ and (b) then a metal sheet which is thinner than the polyethylene sheet by a factor of from 3 to 20, and pressing the sheets into a sandwich assembly under a roller pressure of from 0.1 to 4 kg./cm.$^2$.

2. A process as claimed in claim 1 wherein the temperature of said polyethylene during extrusion is 150° to 220° C.

3. A process as claimed in claim 1 wherein the temperature of said polyethylene during the applying of said film is from 110° to 180° C.

4. A process as claimed in claim 1 wherein the sheet of metal is thinner by a factor of from 5 to 15 than the polyethylene board.

5. A process as claimed in claim 1 wherein the metal sheeting is sheeting of aluminum, copper, brass or steel.

* * * * *